US 6,642,945 B1

(12) United States Patent
Sharpe

(10) Patent No.: US 6,642,945 B1
(45) Date of Patent: Nov. 4, 2003

(54) METHOD AND SYSTEM FOR OPTIMIZING A VISUAL DISPLAY FOR HANDHELD COMPUTER SYSTEMS

(75) Inventor: Timothy David Sharpe, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/564,962

(22) Filed: May 4, 2000

(51) Int. Cl.[7] .................................................. G06F 6/00
(52) U.S. Cl. ........................................ 345/788; 345/156
(58) Field of Search .................................. 345/784, 785, 345/786, 787, 973, 864, 764, 766, 788, 121, 156, 157

(56) References Cited

U.S. PATENT DOCUMENTS

| | | | |
|---|---|---|---|
| 5,760,773 A | * | 6/1998 | Berman et al. ............. 345/156 |
| 5,805,164 A | | 9/1998 | Blum et al. |
| 6,085,202 A | * | 7/2000 | Rao et al. .................. 707/509 |
| 6,433,798 B1 | * | 8/2002 | Smith et al. ................ 345/764 |
| 6,476,831 B1 | * | 11/2002 | Wirth et al. ................ 345/784 |

* cited by examiner

Primary Examiner—Cao (Kevin) Nguyen
(74) Attorney, Agent, or Firm—Merchant & Gould P.C.

(57) ABSTRACT

A system and method for displaying lists of items, such as documents or email messages, wherein the method displays size information without displaying the textual column for this property. The method converts the size information into a percentage of the space in the row. Next, the method shades, in a light color, the calculated percentage of the background space in the row for that item. The shading may begin at the left-hand boundary and continue towards the right-hand boundary. Tick marks and/or values may be displayed in the column headers to indicate the relative sizes based on the shaded background. The shading may otherwise be fixed or relative to the largest item in the list or the both the largest and the smallest items in the list.

21 Claims, 5 Drawing Sheets

| | ✉ | ! | From | Subject ▽ | Received |
|---|---|---|---|---|---|
| | ✉ | | John Doe | Way to go! | Tue 1/25/2000 1:01 PM |
| | ✉ | | Mary Smith | Tomorrow? | Fri 2/11/2000 12:10 PM |
| 📎 | ✉ | | Jane Doe | Recruiting | Fri 2/25/2000 12:20 AM |
| | ✉ | | Mr. Jones | Meeting Time 8AM | Fri 2/25/2000 8:01 AM |
| | ✉ | | John Doe | Directions | Fri 2/25/2000 5:01 PM |
| | ✉ | | Jane Doe | Dinner Plans Can.. | Fri 2/25/2000 7:10 AM |

Fig. 3

METHOD AND SYSTEM FOR OPTIMIZING A VISUAL DISPLAY FOR HANDHELD COMPUTER SYSTEMS

TECHNICAL FIELD

The present invention relates to graphical user interfaces, and particularly to display characteristics and methods for determining display characteristics for user interfaces. More particularly still, the present invention relates to displaying a list of items and their properties using a handheld computing device.

BACKGROUND OF THE INVENTION

Small, handheld computing devices have been steadily growing in popularity in recent years. The devices are known by different names, such as palmtops, pocket computers, personal digital assistants, personal organizers, H/PCs (handheld personal computers), or the like. These devices, hereinafter "handheld computer devices," provide much of the same functionality as their larger counterparts. In particular, the small computer devices provide users the ability to perform word processing, task management, spreadsheet processing, address book functions and Internet browsing, as well as many other functions. Of particular importance to small computer device users is the ability to read and edit text files, such as email or word processing files, from various mobile or remote locations.

Given the small size of these devices, users gain mobility but typically lose other benefits of the larger computer systems. One drawback relates to the fact that small computer devices typically have significantly smaller display areas. That is, these devices tend to have display areas that are less than one-eighth the size of average, desktop display areas. Consequently, due to the limitations of the display sizes, some beneficial information is simply not displayed to users during the use of certain applications.

In particular, when displaying a list of items, such as text documents, the small display limits the number of properties that can be displayed. Essentially, each item has various unique characteristics or properties, such as the item's, name, size, date of receipt for email or the "last-modified" date for other text documents. As space permits, these various properties are displayed in combination with the name of the item in separate columns, providing the user a significant amount of information about each item. Displaying properties in this manner allows the user to visually sort the list of items or quickly identify particular items based on separate criteria. Therefore, if the user is interested in, for example, the largest items from a particular person, the user can sort the items by person and then visually scan the size column to locate the largest items without opening each item or otherwise spend time examining the items. Handheld computer devices however cannot display the same amount of information as the larger monitors simply because of their smaller display screens.

In order to compensate for the small display areas, the small computer devices, or more particularly, the applications running on the small computer devices may eliminate columns of information from the display. For example, in an email application where each email message has a "From" property, a "Subject" property, a "Received" property and a "Size" property, the application may chose or be configured to not show the size column to provide more space for the other columns of information. Simply removing the column of information in this manner, however, is an unsatisfactory solution since the size property is a property that users typically want to see as they scan the list of items since the size can provide valuable insight into the type or nature of the item. Moreover, given the importance of memory management for handheld computers the size property for the various items in a list becomes almost necessary.

An alternative solution to optimizing the display space relates to having the handheld computer device narrow the width of each column. Unfortunately however, narrowing each column significantly limits the amount of property information available to a user. That is, the reduced size of the column typically truncates the information, often to the point that no meaningful information can be gleaned from the remaining text and therefore narrowing columns is generally an unsatisfactory solution. For example, narrowing the "Subject" column from an email application to allow time information to be displayed may truncate the subject text such that the user cannot determine the message subject.

It is with respect to these considerations and others that the present invention has been made.

SUMMARY OF THE INVENTION

The present invention relates to a system and method for displaying a list of items and property information related to each item, such as size information, on a display without displaying the textual column for the property. The method of the present invention relates to translating the width of the display space into a representation of item size. Using the width calculation, the background space used to display the item's other properties, e.g., name or subject, is partially colored or tinted using a light color such that the amount of space that is colored represents a size value for the item. Thus, information is displayed to the user based on properties of the item without displaying explicit text. In order to make the size to width translation, a determination of available space, i.e., the width of the column (or columns) is determined. Next a width/size relationship is determined. Using this width/size determination, an amount of space can be allocated to each item based on that item's size.

The present invention changes the color of the background of its allocated space in a bar format, i.e., changing the color from left to right within the column so that the length of the left-side color is directly related to the size property. Therefore the user can visualize the relative size of the item without showing a size column.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

In accordance with preferred aspects of the invention, an embodiment of the invention uses one column to display the size information, although more than one column may be used. In accordance with other preferred aspects, the present invention relates to a predetermined width/size relationship. Alternatively the width/size relationship may vary based on the relative values in the list.

When the width/size relationship varies, the present invention automatically updates the background configuration values as the relevant characteristics change. Changing the visual characteristics as the relative properties change provides the user with a significant amount information related to the item without displaying explicit text. Tick marks, numbers and/or other labels may be displayed to show the user the representative value of the various item sizes.

A more complete appreciation of the present invention and its improvements can be obtained by reference to the accompanying drawings, which are briefly summarized below, to the following detail description of presently preferred embodiments of the invention, and to the appended claims.

BRIEF DESCRIPTION OF THE DRAWINGS

FIG. 3 is an exemplary display for an email application incorporating aspects of the present invention relating to the use of colored background space.

DETAILED DESCRIPTION OF THE INVENTION

An embodiment of the invention maximizes the use of a display area by providing beneficial information to a user through the use of variations in background color instead of explicit text, such that the explicit text for that information need not be shown to the user. The information is displayed through the use of variations in the colored background space where other information, such as the name of the item is displayed. The variations in the amount of colored background space signify information relevant to the item. Eliminating the display of explicit text for such information increases the available space on the display area allowing the display of additional information.

The logical operations of the various embodiments of the present invention are implemented (1) as a sequence of computer implemented steps or program modules running on a computing system and/or (2) as interconnected hardware or logic modules within the computing system. The implementation is a matter of choice dependent on the performance requirements of the computing system implementing the invention. Accordingly, the logical operations making up the embodiments of the present invention described herein are referred to alternatively as operations, steps or modules.

Figure 1:
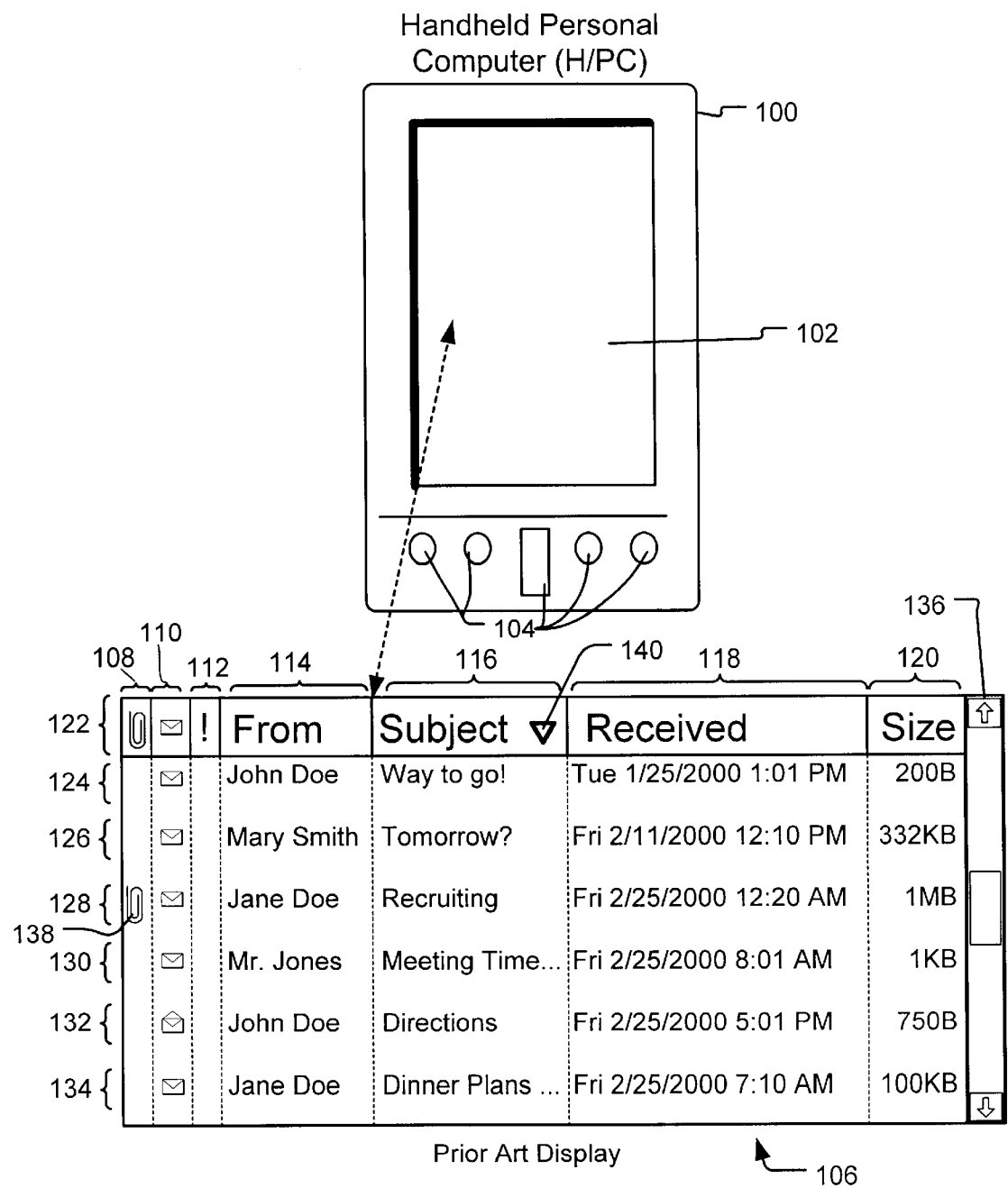
FIG. 1 illustrates a handheld computer displaying a prior art email application user interface.

A computing device 100 having a display 102 to display application user interfaces in accordance with the present invention is shown in FIG. 1. In one embodiment of the invention, the computer 100 is a small handheld computer device, as discussed in the Background Section, having a small or significantly limited display area 102 and input buttons 104 to allow the user to enter information into the computer 100. Moreover, the display 102 may be a touch screen, further allowing user input, yet the touch screen is not necessary. In alternative embodiments, the invention is used in combination with any number of other computer systems or environments, such as in desktop environments, laptop or notebook computer systems, multiprocessor systems, micro-processor based or programmable consumer electronics, network PCs, mini computers, main frame computers and the like. The invention may also be practiced in distributed computing environments where tasks are performed by remote processing devices that are linked through a communications network in a distributed computing environment, programs may be located in both local and remote memory storage devices. In essence, any computer system having a graphical display capable of providing multiple distinguishing characteristics may incorporate the present invention.

The display 102 is able to show two different font/background combinations that enable the user to read the font and recognize a difference in background tinting. One example includes black font on white background and a black font on yellow background where the user can read the font on both backgrounds yet distinguish the yellow from the white. Another example includes a white font on a black background and a black font on a white background. In this case only two colors or hues are used but the user can read the font and distinguish the different background areas from each other. Preferably, the display 102 is capable of displaying colors and hue variations. Alternatively, the display is able to present various levels of gray in order to provide distinguishable visual indicators.

Figure 2:
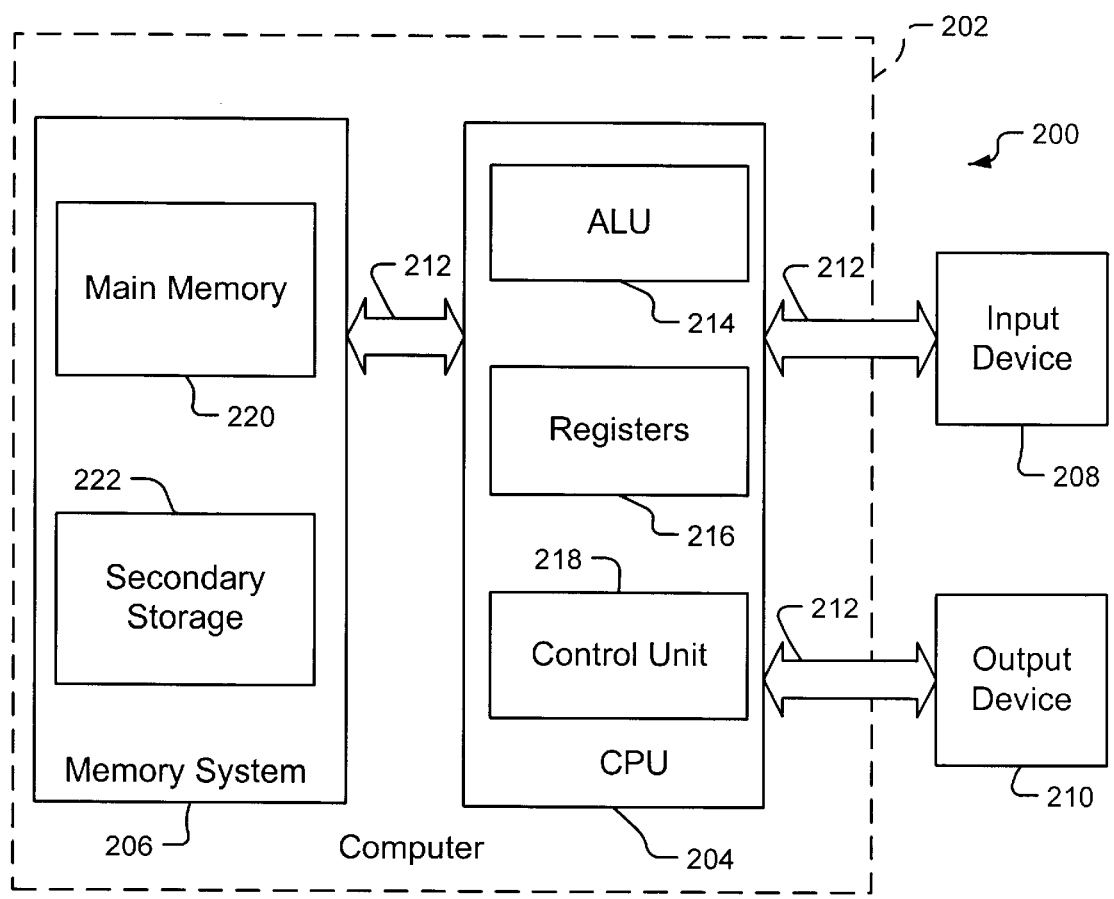
FIG. 2 is block diagram of a computer used in an embodiment of the present invention, such as the computer shown in FIG. 1.

The computer 100 incorporates a system 200 of resources for implementing an embodiment of the invention, as shown in FIG. 2. The system 200 incorporates a computer 202 having at least one central processing unit (CPU) 204, a memory system 206, an input device 208, and an output device 210. These elements are coupled by at least one system bus 212.

The CPU 204 is of familiar design and includes an Arithmetic Logic Unit (ALU) 214 for performing computations, a collection of registers 216 for temporary storage of data and instructions, and a control unit 218 for controlling operation of the system 200. The CPU 204 may be a microprocessor having any of a variety of architectures including, but not limited to those architectures currently produced by Intel, Cyrix, AMD, IBM and Motorola.

The system memory 206 comprises a main memory 220, in the form of media such as random access memory (RAM) and read only memory (ROM), and may incorporate or be adapted to connect to secondary storage 222 in the form of long term storage mediums such as hard disks, floppy disks, tape, compact disks (CDs), flash memory, etc. and other devices that store data using electrical, magnetic, optical or other recording media. The main memory 220 may also comprise video display memory for displaying images through the output device 208, such as display screen 102. The memory can comprise a variety of alternative components having a variety of storage capacities such as magnetic cassettes memory cards, video digital disks, Bernoulli cartridges, random access memories, read only memories and the like may also be used in the exemplary operating environment. Memory devices within the memory system and their associated computer readable media provide non-volatile storage of computer readable instructions, data structures, programs and other data for the computer system.

The system bus 212 may be any of several types of bus structures such as a memory bus, a peripheral bus or a local bus using any of a variety of bus architectures.

The input and output devices are also familiar. The input device can comprise a small keyboard, a mouse, a microphone, a touch pad, a touch screen, etc. The output devices can comprise a color display, such as display 102 (FIG. 1), a printer, a speaker, a touch screen, etc. Some devices, such as a network interface or a modem can be used as input and/or output devices. The input and output devices are connected to the computer through system buses 212.

The computer system 200 further comprises an operating system and usually one or more application programs. The operating system comprises a set of programs that control the operation of the system 200, control the allocation of resources, provide a graphical user interface to the user, facilitate access to local or remote information, and may also include certain utility programs such as the email system. An application program is software that runs on top of the operating system software and uses computer resources made available through the operating system to perform application specific tasks desired by the user. In general, applications are responsible for generating displays in accordance with the present invention, but the invention may be integrated into the operating system, as part of the list view control, for example. An exemplary operating systems includes Microsoft Corporation's Windows CE operating system for small computer devices.

Referring back to FIG. 1, a brief discussion of a prior art display 106 (enlarged to show detail) is beneficial to the understanding of the present invention. The display 106 illustrates a typical listing of items, such as electronic documents or, in this case, email messages. The display is logically partitioned into columns 108, 110, 112, 114, 116, 118 and 120 and rows 122, 124, 126, 128, 130, 132, and 134. Additionally, the display 106 contains a conventional scroll bar 136. The first row 122 of each column provides a heading related to the name or function of the column. For instance columns 114, 116, 118 and 120 comprise information related to who sent the email message, the subject of the email message, the date the email message was received, and the size of the email message, respectively. Thus, for the email message shown in row 124 of display 106, the various properties for that message are shown horizontally across the row, indicating the item is from John Doe, has a subject of "Way to go!", was received on January $25^{th}$ and consumes about 200 bytes of memory. Other columns 108, 110 and 112 may also be included to illustrate other properties associated with the items.

Selecting a heading for a column generally executes a sort function and sorts the items in the list by that column. Selecting the heading again toggles the sort algorithm between ascending order and descending order. The triangle 140, shown in FIG. 1, is displayed in the column currently used to sort the items and thus provides an indicator. Moreover, the triangle 140 points up or down based on whether the column has been sorted using the ascending or descending order.

If the items are sorted by a column, other than by column 120, as shown in FIG. 1, the user needs the "Size" column 120 to determine the relative size information related to each item. Indeed, due to the size of the columns, information in the subject lines for at least two email messages has been truncated, as evidenced by ellipses in the subject column 116 for items displayed in rows 130 and 134. Truncating information in this manner reduces some of the information that could be displayed to the user. In essence, due to the existence of the column 120, display 106 cannot show as much information as a display generated using the present invention, such as display 300, shown in FIG. 3.

Display 300 is an exemplary display generated by an embodiment of the present invention wherein the Size column 120 (FIG. 1) is not shown, yet important size information is still visually provided to the user as described in more detail below. The display 300 displays the same email messages depicted in display 106 (FIG. 1). That is, for the purposes of this description, the properties associated with the messages displayed in FIG. 1 are the same for the corresponding items shown in FIG. 3. Moreover, the items shown in FIG. 3 are sorted according to subject, as in FIG. 1. Thus, the primary difference between displays 106 and 300 is that the column 120 shown in 106 is not visible in 300 and space saving visual elements 302 are shown in FIG. 3 yet are not present in 106.

In essence, while the size column 120 (FIG. 1) is not displayed, size information is still provided to the user through display 300 shown in FIG. 3 through the use of a variably shaded background within the item row. Generally, the space within the row for an item has a primary background color, typically white. By coloring a variable portion of this white background space with a different color, the display can provide additional information to the user. In this case, the user readily determines the approximate size of an object based on the amount of background space that has been colored. Displaying size information in this manner, i.e., without using explicit text, provides more display space for the application to display other useful textual information, such as Subject-line text information, as shown in FIG. 3.

In one embodiment of the present invention, portions 301 of the background of the Subject column only are shaded, wherein the amount of space that is shaded represents size information for the item in that row as shown in 300. For the item in row 134, a relatively small space 302 is colored a different color than a larger space 304, e.g., the remaining portion of the column. Coloring only a small portion 301 of the background, in this embodiment, indicates that the item is a relatively small item. On the other hand, the item in row 128 has a relatively large colored space 301 and a relatively small white space indicating that the item is relatively large. Although shown as only using the subject column, alternative embodiments may use more than one column to increase the available space that may be shaded, which would, in turn, allow the user to distinguish a wider range of item sizes. Moreover, the shading 301 may begin on either the left-hand side and extend to the right (as shown) or the shading may begin on the right-hand side and extend to the left (not shown). In yet another embodiment (also not shown), the shading could begin in lower portion of the item's dedicated row or at the top portion of the item's dedicated row, and extend upward or downward, respectively.

Although relative size information is provided to the user through the use of the space saving elements, e.g., shaded portions 301 of the background, the user may still ascertain the precise size information related to an item. In one embodiment, the user determines precise size information by simply opening the item thereby displaying the size information as part of the header information for the item. In an alternative embodiment the precise size information is determined by placing the cursor over the item for a predetermined amount of time. Placing the cursor over the item in this manner causes a pop-up indicator to display additional information to the user about the "selected" item such as size information.

Additionally, in accordance with preferred aspects, the user may still sort items based on size information. The user may select such sorting functionality from a menu, or an icon may be placed on the display, which may be selected to automatically sort the items according to the size of the items, from the smallest to the largest (ascending) or from the largest to the smallest (descending). Selecting the icon again toggles the sorting process between ascending and descending order.

Importantly, the shading color is selected such that the text in the column is visible. For example the shading may employ a light color such as yellow so that the contrast is sufficient to indicate size information but not so dark as to make the text difficult to read or otherwise distract the user. Other embodiments may incorporate other font/background combinations.

The amount of background space that is shaded for each item depends, not only on the size of the item, but also the width/size relationship for the display. That is, a predetermined width/size relationship is used to covert the size of an item into a width of background space that is to be shaded. In an embodiment, the width/size relationship is relatively static and is set so that each centimeter of the available row translates into a predetermined size.

As an example, consider a handheld device that has a potential screen width of 5 cm. If the width/size relationship is set to 200 KB per cm, then files up to 1 MB can be distinguished from each other. In this example, files over 1 MB will have a fully tinted or shaded background and thus the user could not readily distinguish those files from each other. For example, a 1.2 MB file will look, in terms of shaded background, the same as a 2 or 3 MB file. Of course, the static width/size relationship could be configured or tailored to other values. In an embodiment, the user is able to select/change this relationship from a menu or another user-interface control. Although described in terms of centimeters, the actual values may not be determined in those terms, instead, percentages may be used to display the different shaded portions. Thus, the width/size relationship would be described in percentage terms, e.g., 100 percent of the background is shaded for a 1 MB item and 50 percent is shaded for a 500 KB item.

In other embodiments, the width/size relationship is not static, instead it is more dynamic. That is, the width/size relationship changes automatically, based on the relative sizes of the files in the list. In one embodiment, the width/size relationship is set according to the largest file in the list. The relationship is determined by dividing a value representing the size of the largest item by a value representing the available width of background space for shading. As an example, if the largest file is 1 MB, and the total available space is 4 cm, then the width/size relationship is 250 KB per cm (or 25 percent of the available width). However, if the largest file has a size value of 100 KB, then the relationship (for a 4 cm width) is 20 KB per cm. This embodiment provides the ability to show the size information of all items, and no two items having different size values will have the same amount of background space shaded.

In this embodiment, regardless of how small the items in the list are, the largest file will have a fully tinted background, and the second largest will not have a fully tinted background. The large files having item sizes of 2 and 3 MB discussed above in the preceding example, will have different amounts of shaded background space so their sizes can be identified. This is not true in the above example where the width/size relationship is static and set so that only items less than 1 MB in size can be distinguished.

Although the dynamic width/size relationship provides the ability to distinguish all size values, there is a practical limitation as to how distinguishable files sizes are when the width/size relationship is based on a relatively large file. For example, the user may not be able to distinguish different size values for relatively small items if there happens to be a relatively large item in the list. If the largest item is 5 MB, and the available space is only about 2 cm, then the relationship is reduced to about 2.5 MB per cm. A relationship of this sort may cause smaller files, such as those in the 1–5 KB range to appear to have the same amount of shaded background space and the user's ability to distinguish these files based on item size is diminished. Therefore, the embodiment preferably allows the user to switch from a dynamic relationship to a static relationship using a menu option or other user interface control. Alternatively, the user may be able to at least limit the upper size value for the width/size relationship to alleviate this potential problem.

In yet another embodiment having a dynamic width/size relationship, the relationship depends on the difference in size between the largest and smallest item. In this case, the smallest item is allocated only a small portion of the background and the largest is fully shaded as discussed above. As an example, assume a list of items where each item is between 2 and 3 MB in size. For this embodiment, the smallest item (approximately 2 MB in size) is allocated only a very small portion of background shading. The largest item (approximately 3 MB) is allocated substantially all the background space for shading. In this embodiment, the shading maximizes the available space in providing the user the ability to distinguish items based on their sizes.

When using a dynamic width/size relationship, size information for all the items in the list are shown relative to the largest item. If another item is added that is larger, the percentages are automatically recalculated based on the larger item. Indeed, anytime a change is made to the list, such as through the addition of an item, the deletion of an item or the change in column size, the width size relationship must be reevaluated. If the relationship changes, then all the allocated values must be recalculated.

Since the portions would be changing quite often, A user would most likely analyze the precise size information for the largest file so the remaining relative size information is meaningful. Additionally, tick marks (not shown) may be displayed along the top or bottom of the display to indicate different size values. These marks may be static in that they always stand for particular size increments, e.g. 50 KB, or they may dynamic and vary according to the relative sizes of the items in the list. Numbers may be placed near each tick mark or a possibly just a few tick marks to indicate their representative values. The tick marks are especially beneficial when using a dynamic width/size relationship since they provide the user a guideline for the relative size determinations.

Whether the width/size relationship is static or dynamic, the width/size relationship is used to shade the portions 301 (FIG. 3) according to the size value of the item. In one embodiment the precise size is used in combination with the width/size relationship to calculate a fairly precise width measurement. This may be as simple as a multiplication of the size of an item by the width/size relationship value. Alternatively, the size values for the items could be rounded, e.g., to the nearest KB, potentially simplifying the calculation process. In yet other embodiments, predetermined ranges could be stored in a lookup table with corresponding width values to achieve the determination of actual amount of background to shade.

In an alternative embodiment the entire background space may be colored, only the color may vary along a gradient wherein one extreme represents a very large item and the other extreme represents a very small item. For this case, one extreme color, e.g., yellow, represents a large item and the other extreme color, e.g., white, represents a small item. Lighter variations of yellow can be used to signify medium sized files.

Figure 4:
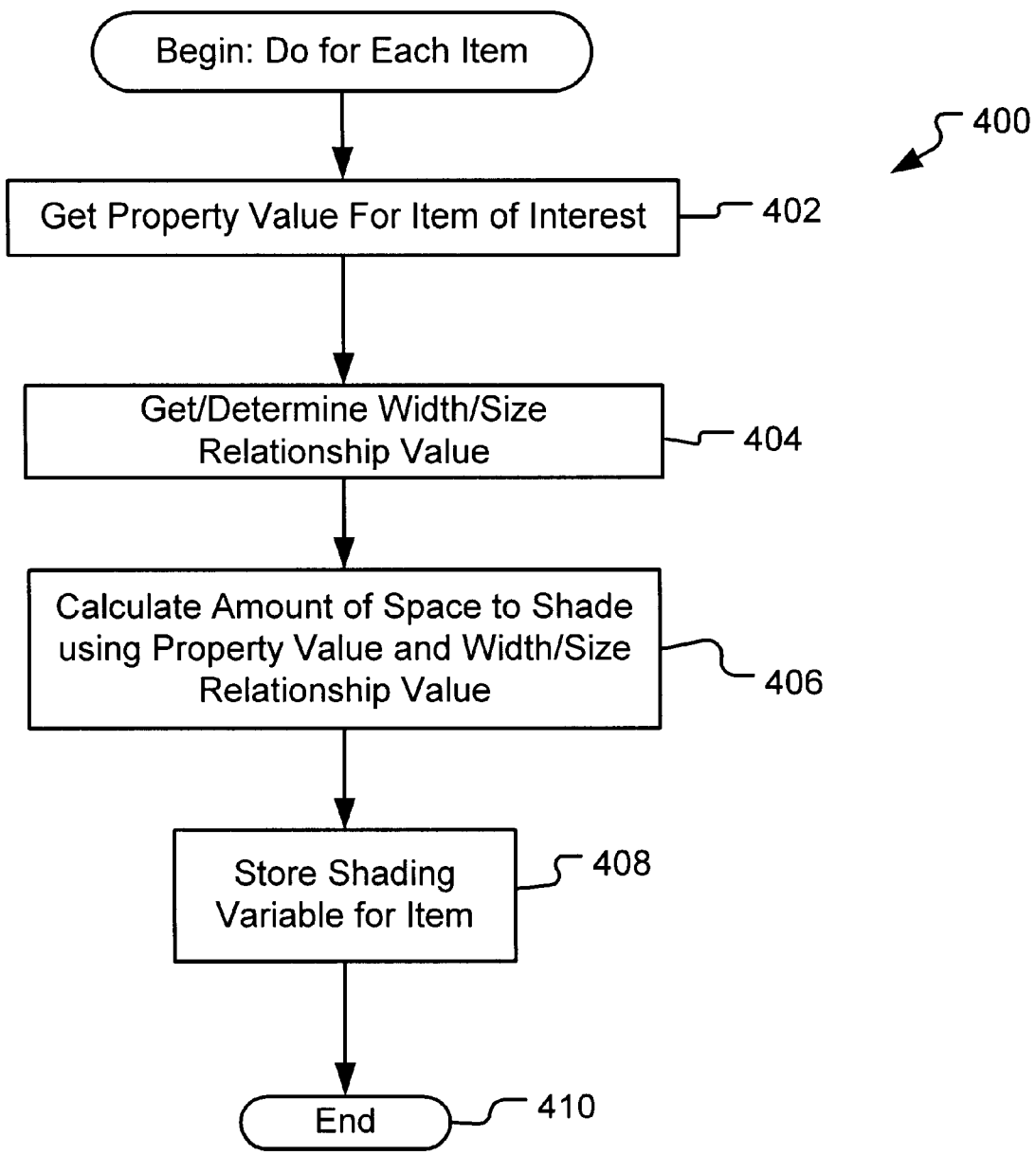
FIG. 4 is a flow diagram showing the operational characteristics of determining the amount of background space to shade for an item that is to be displayed.

FIG. 4 is a flow chart of the operations in one embodiment of the present invention. The display operation flow 400 is typically executed for each item in the list of displayed items. Different criteria may be used to initiate the display process 400. That is, method 400 may be cycled through each time the screen is updated or refreshed. Otherwise, since sizes of files typically don't change, the process 400 can be executed only when the list of items changes, or if the width/size relationship is static, then only for newly added items, while the existing items are not reevaluated. Executing process 400 too often may impair performance and thus users may decide to reduce the frequency at which the background shading values are updated. However, for relative shading the process 400 should occur sufficiently often to update size information related to the various items.

Once the operation flow 400 has begun, get operation 402 gets the necessary size information related to the current item. The size information is typically stored in the heading of the item such that retrieving this information is fairly straightforward.

Following get operation 402, get/determine module 404 gets the width/size relationship for the list of items. If the width/size relationship is a relatively static value, as discussed above, then module 404 simply retrieves this information. However, if the width/size relationship is dynamic, and it has not been determined, then module 402 determines a value representing the width/size relationship as discussed below in conjunction with FIG. 5. Once the width/size relationship has been determined, the value is returned to be used by the next operation 406.

Calculate operation 406, then uses the width/size relationship value and the size value for the current item to calculate an amount of space to shade. Calculate operation 406 either calculates a determined amount based on a static width/size relationship or a percentage value that relates to the amount of the column that should be shaded. This percentage may vary depending on whether a fixed percentage exists for particular item sizes or whether the percentage is relative to the items in the current list.

Once the percentage has been calculated, store operation 408 both assigns a visual indicator, i.e., a portion to shade, based on the percentage calculation to the item and stores the shading percentage for the item for future reference. That is, since flow 400 is not executed every time the display is refreshed, the shading percentage is stored and used by the display module during each refresh operation. However, if the flow 400 is executed each time the display is refreshed, then operation 408 simply displays the item using the assigned shading percentage.

Figure 5:
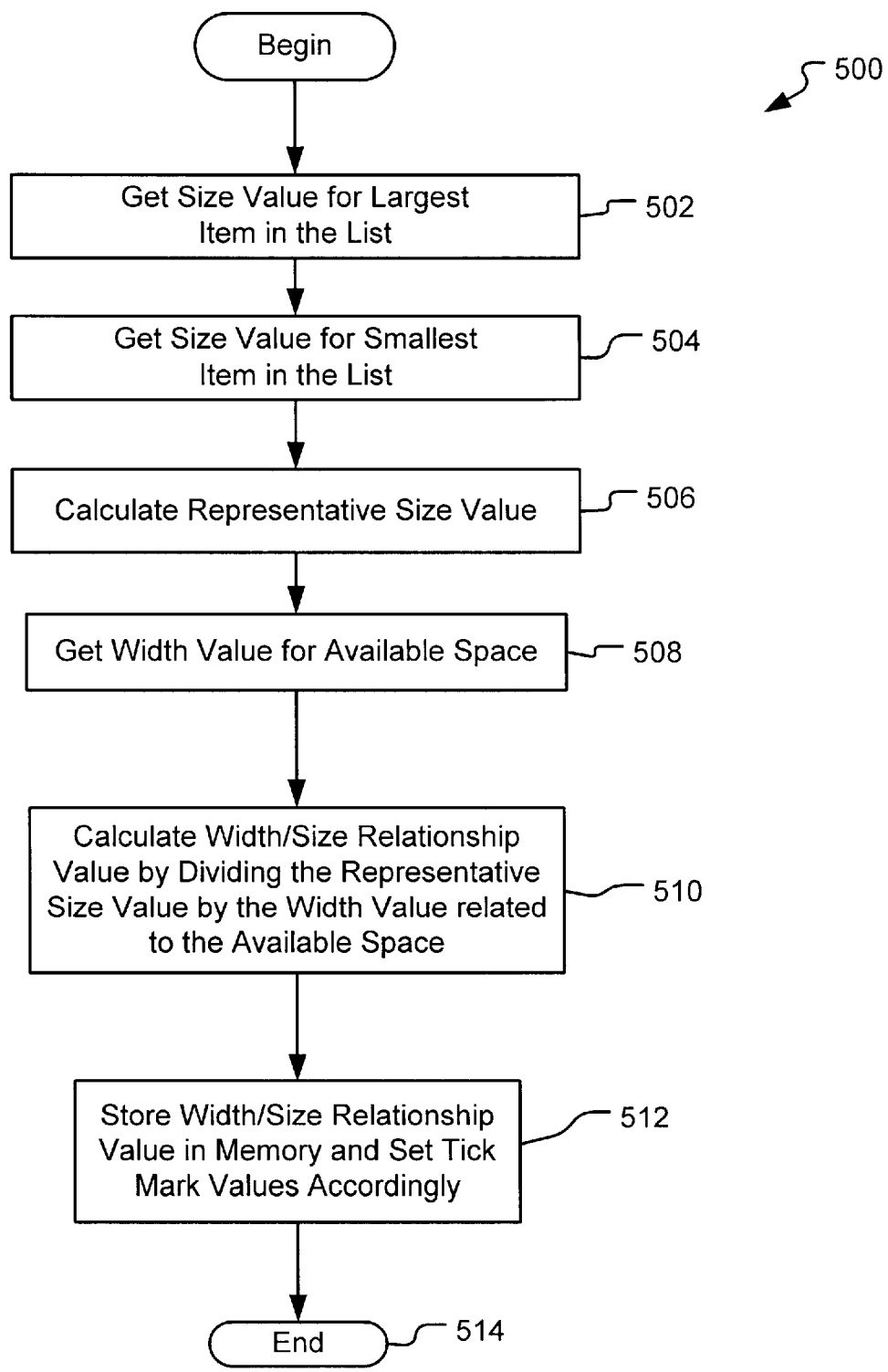
FIG. 5 is a flow diagram showing the operational characteristics of determining the width/size relationship value for an alternative embodiment using size values for items in the list to determine the relationship value.

The operation flow 500, shown in FIG. 5 relates to the determination of the width/size relationship value, as described above with respect to module 404 (FIG. 4). The process 500 begins get operation 502, which gets the size value for the largest item in the list. This operation involves the analysis of the list of items based on the size of each item. Once the largest value is determined, the size for that item is returned. Next, the size value for the smallest item is retrieved by get operation 504. Operation 504 can be performed substantially simultaneously with operation 502, as it requires an analysis/comparison of each of the items in the list based on size information.

Once the size values for both largest and the smallest items have been retrieved, then calculate operation 506 calculates a representative size value. The representative size value is the relative size difference between the beginning of the available shading area, e.g., the left-hand side and the end of the shading area, e.g., the right-hand side. The representative value is the difference between the size value for the largest item and size value for the smallest item. Thus, calculate operation 506 subtracts the size value for the smallest item in the list from the size value for the largest item in the list.

Of course, operations 504 and 506 are only necessary in those embodiments that calculate a width/size relationship based on both the largest and the smallest items in the list. If the width/size relationship does not utilize the smallest item on the list then operations 504 and 506 may be skipped and the representative value is equal to the size value for the largest item in the list.

Following the calculation of the representative value, the available width for shading is determined. This value is readily determinable, as it equals the width of the column, or columns used for shading. In some embodiments, the user may modify the column widths. However, if percentages are used, this step may not be necessary, as different percentage values may be used instead of actual width values. Either way, a width value is determined during this operation or predetermined using a percentage, e.g., 100 percent of the available width.

Next, calculate operation 510 calculates the width/size relationship value by dividing the representative size value by the width value. This width size relationship is then stored, at store operation 512, in memory to be used by module 404, FIG. 4. Also, operation 512 may be used to set tick mark values for the tick marks that are to be displayed along with the shaded portions that indicate relative size values for the listed items.

The above described embodiments of the invention capitalize on newer displays that incorporate color technology to provide information to the user that otherwise might not be shown, such size information, by analyzing the item and modifying a visual indicator, such as the background color for the item. Specifically, the present invention analyzes the size of an item and using the background space displays that size information to the user. The background space for the name of an item in a list is typically white. The present invention contemplates changing the color of the background in a bar format, i.e., changing the color from left to right within the column. Therefore the user can visualize the relative size of the item without showing a size column, thereby freeing space for other columns of information.

Although the invention has been described in language specific to structural features and/or methodological steps, it is to be understood that the invention defined in the appended claims is not necessarily limited to the specific features or steps described. As an example, portions of different colored fonts could be used to indicate size information, instead of portions of colored background space. Therefore, the specific features and steps are disclosed as preferred forms of implementing the claimed invention.

What is claimed is:

1. A method of displaying property information for an item in a graphical user interface on a computer system, the method comprising;

calculating a percentage of background space to shade;

shading the background space according to the percentage; and displaying the item in combination with the shaded background space indicating size information.

2. A method as defined in claim 1 wherein the calculating operation utilizes more than one property column as available background space.

3. A method as defined in claim 1 wherein the shading operation shades the available space from the left to the right.

4. A method as defined in claim 1 wherein the shading operation shades the available space from the right to the left.

5. A method as defined in claim 1 wherein the shading operation shades the available space from lower boundary of an item row towards the upper boundary.

6. A method as defined in claim 1 wherein the percentage is converted to a gradient value and the shading operation shades the entire background with a color based on the gradient value.

7. A method as defined in claim 1 further comprising the following step:

displaying a maximum size value indicating relative sizes for the shaded portions.

8. A method as defined in claim 7 further comprising:

displaying intermediate tick marks to allow the user to more readily determine the size of an item based on the shaded background.

9. A method as defined in claim 1 wherein the percentage is calculated to indicate size of an item relative to the largest item in the list.

10. A method as defined in claim 9 wherein the percentage is further calculated to indicate size of an item relative to the smallest item in the list.

11. A system for displaying size property information for items in a list, the system comprising:

a memory unit storing an item wherein the item has a size property characteristic;

a processing unit calculating a percentage of background space to shade based on the size property characteristic;

a display unit displaying the item in combination with the shaded background space according to the calculated percentage.

12. A system as defined in claim 11 wherein the percentage of background space is based on a predetermined static width/size relationship.

13. A system as defined in claim 12 wherein the static width/size relationship is configurable by a user of the system.

14. A system as defined in claim 11 wherein the percentage of background space is based on a dynamic width/size relationship.

15. A system as defined in claim 14 wherein the list of items has a largest item and a smallest item and the dynamic width/size relationship is based on the largest and the smallest item in the list.

16. A system as defined in claim 15 wherein the width/size relationship is automatically updated as the list is modified.

17. A computer program product readable by a computer, the product encoding instructions for executing a computer process for displaying size information using non-textual characteristics, said process comprising:

determining the size information for an item;

translating the size information into a percentage of background space to shade; and displaying the size information by shading the percentage of background space for the item.

18. A computer program product as defined in claim 17 wherein the percentage of background space is calculated relative to other items in the list.

19. A computer program product as defined in claim 18 wherein the product is adapted to automatically update the percentage when the list is modified.

20. A graphical user interface for a computer system, the graphical user interface having a display module for displaying a list of items, said graphical user interface comprising:

a list view having a plurality of columns and rows, wherein one of each column or row displays at least one predetermined property type and the other of each row or column lists properties for an item;

a calculation module that calculates a width/size relationship based on the relative sizes of the items in the list;

a conversion module that converts size information for each item into a percentage value based on the width/size relationship, the percentage value related to an amount of background space to be tinted; and a display module that displays the list view in accordance with the percentage values.

21. A graphical user interface as defined in claim 20 further comprising:

an update module that updates the width/size relationship as the number of items in the list changes;

the conversion module converting the property information for each item according to the updated width/size relationship value; and the display module displaying the items in response to the new variable visual indicators.

* * * * *